United States Patent
Findikoglu et al.

(10) Patent No.: US 12,203,892 B1
(45) Date of Patent: Jan. 21, 2025

(54) DETECTION AND MONITORING OF CRACKS AND FRACTURES USING NONLINEAR RESPONSE TO MULTIMODE ACOUSTIC SIGNALS

(71) Applicant: Triad National Security, LLC, Los Alamos, NM (US)

(72) Inventors: Alp Tugrul Findikoglu, Santa Fe, NM (US); Taeho Ju, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 293 days.

(21) Appl. No.: 17/951,706

(22) Filed: Sep. 23, 2022

Related U.S. Application Data

(60) Provisional application No. 63/248,336, filed on Sep. 24, 2021.

(51) Int. Cl.
   *G01N 29/14* (2006.01)
   *G01H 1/14* (2006.01)
   (Continued)

(52) U.S. Cl.
   CPC .............. *G01N 29/14* (2013.01); *G01H 1/14* (2013.01); *G01H 1/16* (2013.01); *G01N 29/12* (2013.01);
   (Continued)

(58) Field of Classification Search
   CPC ........ G01N 29/00; G01N 29/04; G01N 29/07; G01N 29/11; G01N 29/12; G01N 29/14;
   (Continued)

(56) References Cited

U.S. PATENT DOCUMENTS

| 10,444,202 B2 | 10/2019 | Flynn et al. |
| 10,473,625 B2 | 11/2019 | Findikoglu et al. |
| (Continued) | | |

FOREIGN PATENT DOCUMENTS

| KR | 20100072820 A | * 7/2010 | ............ G01N 29/12 |
| WO | WO-2019209654 A1 | 10/2019 | |

OTHER PUBLICATIONS

Machine Translation of KR-20100072820-A (Year: 2010).*
(Continued)

*Primary Examiner* — Nguyen Q. Ha
(74) *Attorney, Agent, or Firm* — Klarquist Sparkman, LLP

(57) ABSTRACT

Methods and apparatus are disclosed for assessment of microstructural defects in a large structure. Third order elastic constants engender nonlinear excitation of acoustic modes particularly at points of local stiffness changes or stress concentration such as ends of microcracks. A broadband multimode acoustic signal is transmitted through an interrogation region from a first transducer, whereby a second transducer receives an acoustic signal containing linear and nonlinear components. Linear terms are canceled, and a magnitude of the nonlinear acoustic response is measured using time-resolved spectral analysis, to determine a coefficient for acoustic nonlinearity of the interrogation region that serves as a qualitative or quantitative representation of microcrack damage. Broadband signals avoid mode-specific effects such as shadowing or phase mismatch. Damage location can be identified by region or time-of-flight. Portable or dedicated embodiments can be deployed on a wide range of structures of arbitrary shape.

20 Claims, 9 Drawing Sheets

(51) Int. Cl.
   *G01H 1/16*      (2006.01)
   *G01N 29/12*     (2006.01)
   *G01N 29/36*     (2006.01)
   *G01N 29/46*     (2006.01)

(52) U.S. Cl.
   CPC ..... *G01N 29/46* (2013.01); *G01N 2291/0289* (2013.01)

(58) Field of Classification Search
   CPC ............ G01N 29/36–42; G01N 29/46; G01N 2291/0289; G01H 1/14; G01H 1/16
   See application file for complete search history.

(56) References Cited

U.S. PATENT DOCUMENTS

| | | |
|---|---|---|
| 10,585,069 B2 | 3/2020 | Findikoglu et al. |
| 10,996,203 B2 | 5/2021 | Findikoglu et al. |

OTHER PUBLICATIONS

"ALArM: Acoustic Large-Area Monitoring." Los Alamos National Laboratory, LA-UR-22-23053, 25 pages, document dated May 2022.

Ju et al. "Large Area Detection of Microstructural Defects With Multi-Mode Ultrasonic Signals." *Applied Sciences*, 12, 2082, pp. 1-11 (Feb. 2022).

Ed. Meyendorf et al. "Nondestructive Materials Characterization," Springer, excerpt, pp. 2-4 (2004).

\* cited by examiner

DETECTION AND MONITORING OF CRACKS AND FRACTURES USING NONLINEAR RESPONSE TO MULTIMODE ACOUSTIC SIGNALS

CROSS-REFERENCE TO RELATED APPLICATIONS

This application claims the benefit of U.S. Provisional Application No. 63/248,336, entitled "DETECTION AND MONITORING OF CRACKS AND FRACTURES USING NONLINEAR RESPONSE TO MULTIMODE ACOUSTIC SIGNALS," filed Sep. 24, 2021, which application is incorporated by reference herein in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

BACKGROUND

Cyclic loading or other stresses can lead to development of cracks and crack growth in a structure, leading to eventual failure. An effective characterization of structures is required at an early damage stage to prevent catastrophic failure and predict remaining life. While ultrasound can be used for non-destructive testing, conventional ultrasound techniques are often limited by crack size-by the time a crack is detectable with such techniques, a structure may already have consumed 80-90% of its fatigue life and can be close to failure. Additionally, small cracks, sometimes termed microcracks or microstructural defects, can themselves compromise the mechanical strength and integrity of the structure. Some conventional approaches to detecting microcracks are dependent on precise modeling of a specific structure or specific sensor placement, which can be laborious to configure for each structure to be evaluated, and which are not readily portable. Accordingly, there is still a need for improved techniques for detection or monitoring of cracks or fractures in large areas and in a wide range of structures.

SUMMARY

In brief, the disclosed technologies provide sensitive detection of microstructural defects in large structures based on nonlinear response to broadband, multimode acoustic (or, ultrasonic) excitation in the presence of defects. A broadband or multimode acoustic probe signal can be propagated throughout an interrogation region of a large structure. Microstructural defects can give rise to nonlinear scattered acoustic signals in response, which can be detected, separated from a linear response, and measured. A broadband acoustic probe signal can excite many modes within the large structure, to find some one or more modes satisfying a phase matching condition. Additionally, the broadband multimode signal can diffuse throughout the large structure, avoiding mode-specific shadow regions. Distinct transmitter-receiver pairs of acoustic transducers can probe respective interrogation regions, allowing defect regions to be localized to one or more interrogation regions. Interrogation regions are not limited to line-of-sight, but can extend through reflection, scattering, or guided wave propagation of acoustic signals to non-line-of-sight (NLOS) locations.

In certain examples, the disclosed technologies can be implemented as a method for identifying microstructural defects in a rigid structure. A first acoustic transducer coupled to a first location on the structure is used to transmit a broadband multimode first acoustic signal through an interrogation region of the large rigid structure. A second acoustic transducer coupled to the structure at a second location spaced apart from the first location is used to receive a second acoustic signal responsive to the first acoustic signal. The interrogation region is dependent on the first and second locations, and has an extent at least ten times a largest transverse extent of a sensor contact area of the first acoustic transducer. A linear response from the second acoustic signal is canceled to obtain a nonlinear third acoustic signal. Based at least in part on a magnitude of the third acoustic signal, an acoustic nonlinearity of the interrogation region is determined and, based on the determined acoustic nonlinearity, an assessment result is outputted. Implementations, variations, and extensions of the method are described further herein.

In certain examples, the disclosed technologies can be implemented as a computer-readable medium storing instructions which, upon execution by a computer, cause such a method, variation, or extension to be performed. In further examples, the disclosed technologies can be implemented as a system incorporating a controller configured to perform such a method, variation, or extension; together with the first and second acoustic transducers, a signal generator, and a signal receiver. The signal generator has a control input coupled to the controller and a signal output coupled to the first acoustic transducer. The signal receiver has a signal input coupled to the second acoustic transducer and a receiver output coupled to the controller.

The foregoing and other objects, features, and advantages of the invention will become more apparent from the following detailed description, which proceeds with reference to the accompanying figures.

DETAILED DESCRIPTION

Figure 1:
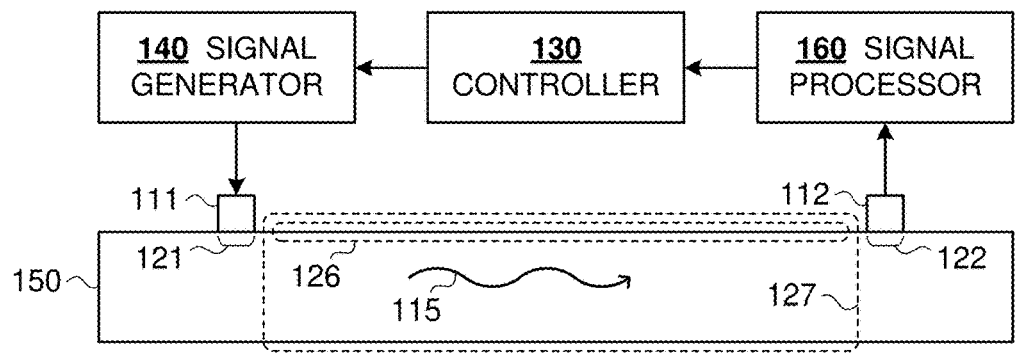
FIG. 1 is a diagram of a system configured to implement some examples of the disclosed technologies.

This disclosure is set forth in the context of representative embodiments that are not intended to be limiting in any way.

Overview

While ultrasound techniques have been in use for non-destructive testing of structures, conventional techniques can be limited in sensitivity and only able to detect relatively large defects. Significant damage can occur in structures due to a large number of so-called microcracks which even collectively may be below the sensitivity floor of a conventional ultrasound diagnostic. As used herein, microstructural defects and microcracks refer to cracks or other defects having a longest dimension in the range 0.1 μm-100 μm. Microstructural defects and microcracks often occur in clusters, over regions having extent up to 10 cm in one or more directions. These regions can also include individual cracks having a longest dimension 100 μm to 1 cm. Some approaches to improve sensitivity for microcracks have relied on cumbersome modal analysis or specialized transducers, which may not be feasible for efficient, portable, or reliable damage estimates. Such techniques can also be highly specific to particular acoustic modes, which may be sensitive to some microcracks but not others, e.g., dependent on location or orientation of a microcrack, and can also be sensitive to precise locations of transducers.

The disclosed technologies utilize nonlinear effects stimulated by broadband acoustic signals. Broadband acoustic signals have an advantage in coupling acoustic energy into many different modes-either simultaneously, in the case of an impulse excitation, or progressively in time, in the case of a chirp excitation. A "broadband" signal has a bandwidth or spectral content spanning at least one octave. A "multi-mode" signal has two, three, four, or more modes or types of acoustic signals intentionally excited. Accordingly, a microcrack not seen by one mode can be seen by another mode. Aggregated over modes, a broadband excitation can couple to, and can detect, a vast majority of microcracks present in a structure, even for a structure having a complex shape over large areas.

Nonlinear effects take advantage of the fact that microcracks can often make up in numbers what they lack in size. Typically, a microcrack can have two ends, although more complex shapes are possible. Each end of a microcrack typically has an acute angle which can result in stress concentration. Closing and opening of the cracks can result in local stiffness changes in the presence of acoustic excitation. Common structural materials have second order elastic coefficients involved in linear scattering of acoustic waves, and also have considerably smaller third order coefficients that can give rise to higher order scattering. Because of the relative size of the second and third order elastic coefficients, a smooth bore hole in a structure can have an insignificant nonlinear response. However, because of the combined effects of (i) stress buildup at crack ends and (ii) large numbers of micro-cracks, the aggregate nonlinear response of a field of microcracks can be substantial and readily detectable.

Although detectable, nonlinear response is often still small compared to linear components in a received signal, and it can be desirable to cancel the linear terms for better sensitivity or accuracy for measuring the nonlinear response. Cancellation techniques described herein include extrapolation from a baseline linear response; polarity inversion; filtering; or nulling coefficients in a spectral domain.

In some examples, the nonlinear signal can be analyzed in a two-dimensional frequency-time domain to determine a magnitude of the nonlinear response. This magnitude can be proportional to the square of the transmitted signal amplitude, or proportional to another power of the transmitted signal amplitude. In some examples, the constant of proportionality can be used as or converted to a coefficient of acoustic nonlinearity which is a measure of the extent of nonlinear scattering centers (e.g., the extent of microstructural damage) in the structure. The acoustic nonlinearity coefficient (or simply "acoustic nonlinearity") can be used as a qualitative or quantitative measure of crack damage. Acoustic nonlinearity can be compared between regions, or can be compared over time to monitor fatigue in the structure. Using predetermined thresholds or other criteria, an alert can be generated for large values or large changes in acoustic nonlinearity, and further analysis or remediation can be taken.

An interrogation region of a structure can extend along an acoustic path from one acoustic transducer (e.g., a transmitter) to another transducer (e.g., a receiver). Multiple transducer pairs allow assessment of multiple regions of the structure, so that a particular region having higher nonlinear response can be distinguished from other regions, and identified as a damage location. Embodiments of the disclosed technologies advantageously allow large structures to be efficiently interrogated using one or more large interrogation zones. A "large" interrogation zone has an extent (defined as length of a shortest acoustic path from the transmitting transducer to the receiving transducer, which need not be a straight line) at least 5, 10, 20, 50, 100, or 200 times the largest transverse extent of the transmitting transducer or the receiving transducer. A transducer's extent can be defined by the largest transverse dimension (e.g. in the plane of contact) of an active area in contact with the structure (the "contact area"). To illustrate, a 3 mm×4 mm transducer can have a largest transverse extent of 5 mm (by Pythagoras' theorem). An interrogation zone 10× the extent of the transmitting transducer can have an areal extent about 100× the contact area of the transducer.

Thus, disclosed technologies can be used for both detection (is damage present? where is damage located?) and monitoring (has damage increased over time? has damage spread to a new location?) of microstructural damage.

The disclosed technologies can also be used to assess fractures. Unlike a smooth hole, a material fracture often can have jagged edges with a large number of corners where acoustic stress can be concentrated. Detection of fractures can be performed using reflected acoustic paths, i.e., with transmitting and receiving transducers located on a same side of the fracture. Because of the geometry, time of flight can be used to estimate acoustic path length, and thereby also a sum or average of distances from transducers to the fracture.

The disclosed technologies are easily deployed and suitable for a wide range of structures, including without limitation civil structures, machinery, transportation vehicles, pressure vessels, confinement vessels, other containers, and defense equipment. The disclosed technologies can be deployed on structural components such as beams and pipes before or after installation. Microcracks can also arise in silicon wafers or solar panels, or between layers of a composite or laminate material (such as an electrode-insulator composite), where the disclosed technologies can indicate incipient delamination. Inasmuch as plastic deformation is associated with microstructural damage, the disclosed technologies can detect plastic deformation at an early stage. Many prospective applications of the disclosed technologies are safety critical. The disclosed technologies can advantageously reduce risks of catastrophic failure in a correspondingly wide range of applications, and can also extend service lifetimes. Moreover, information gathered with the disclosed technologies can be used to improve processes for manufacturing and maintaining such structures. These and other advantages are brought out through the examples described herein.

Example System

FIG. 1 is a diagram 100 of a system configured to implement some examples of the disclosed technologies. The illustrated system launches a probe acoustic signal in a test structure and detects a response acoustic signal. The response signal can include at least a component which is a nonlinear response as described herein.

Signal generator 140 has a control input and a signal output. The signal output can be coupled to drive first acoustic transducer 111 mounted at first location 121 on structure 150. The control input can be coupled to receive input from controller 130. To illustrate, signal generator 140 can be programmed to generate a chirp signal having a linear frequency sweep from 20 kHz to 200 kHz over a sweep duration of 1 ms, with a constant peak-to-peak amplitude of 1 V, and signal generator 140 can receive trigger input from controller 130. As another illustration, signal generator 140 can be programmed for free-running generation of Gaussian pulses of amplitude +5V, full-width-half-maximum (FWHM) of 2 µs, and a pulse repetition rate of 10 kHz, for which the signal generator 140 can receive programming input from controller 130. These numerical examples are merely illustrative, and the disclosed technologies can be implemented with other signal configurations. For example, excitation frequencies from 1 kHz to 10 MHz can variously be used, or Gaussian pulses having 0.02 us to 0.2 ms FWHM can be used.

Signal generator 140 can excite an acoustic wave 115 in structure 150. Acoustic wave 115 can have transverse components, longitudinal components, or a combination. As illustrated, acoustic wave 115 can be a bulk acoustic wave propagating within the body of structure 150. In some directions of propagation, acoustic energy derived from wave 115 (which can include the direct wave emanated from transducer 111, or scattered, reflected or other secondary waves generated within structure 150, including nonlinear acoustic responses) can reach a receiving acoustic transducer 112.

An interrogation region 127 is constituted by locations within structure 150 which can (i) receive a transmitted wave 115, (ii) generate secondary waves able to reach receiving transducer 112. That is, interrogation region 127 can depend on the particular locations 121, 122 where transducers 111, 112 are coupled to structure 150. Interrogation region can also depend on the geometry of structure 150 or a directionality or polarization of transducers 111, 112 as coupled to structure 150. For bulk acoustic waves 115, the interrogation region 127 can be a bulk volume of structure 150. In other examples, transducer 111 can launch surface acoustic waves (not shown) in which the bulk of acoustic energy is confined within a finite depth from the surface of region 150. For surface acoustic waves, the interrogation region can be an area 126 on the surface of structure 150. In other examples, microstructural defects can scatter an incident surface wave into a bulk secondary wave, or can scatter an incident bulk wave into a surface secondary wave. Acoustic waves 115 are not necessarily restricted to interrogation zone 127 (or 126) but can be transmitted in various other directions or locations within structure 150 that have weak or insignificant coupling to receiving transducer 112. However, in some examples, e.g., where the structure dimensions are comparable to the spacing between transducers 111, 112, the interrogation region can extend over substantially the entire volume (or, an entire surface) of structure 150.

In some embodiments, the interrogation region 126 may include a large area compared with the contact surface area of transducer 111 ("sensor area"). In some embodiments, the ratio of the interrogation area to the sensor area may be greater than about 100, greater than about 1,000 or even greater than about 10,000. For example, the ratio of the interrogation area to the sensor area is in embodiments between about 100 to about 10,000. In other words, the area of an interrogation region may be about 100 times to about 10,000 times the area of the contact surface of a transducer such as transducer 111.

At location 122, transducer 112 can receive a secondary acoustic wave and, in some instances, a portion of the primary transmitted wave 115. The secondary acoustic wave can include linear components (at a same frequency as transmitted wave 115), harmonics (e.g., a second order mode at twice the frequency of transmitted wave), and/or other higher order modes (e.g., coupling at frequency $m \cdot F1 \pm n \cdot F2$ for co-existing transmitted wave components at frequencies F1, F2 and positive integers m, n). A signal input of signal processor 160 can be coupled to receive analog, digital, or other output from transducer 112 corresponding to acoustic signal(s) received at transducer 112. Signal receiver 160 can perform analog or digital signal processing on a representation of the received signal including, without limitation, functions such as amplifying, filtering, windowing, rectifying, detecting, comparing (e.g., with a threshold), transforming, spectral analysis, or custom processing. A receiver output of signal receiver 160 can be coupled to controller 130 for further action on results of the signal processing.

Numerous variations and extensions of the depicted system can be implemented within scope of the disclosed technologies. In some examples, the functions of controller 130 can be distributed among a plurality of computing devices, which can be proximate to or remote from transducers 111, 112. In varying examples, one or both of transducers 111, 112 can be mounted apart from structure 150 and can be coupled to locations 121, 122 of structure 150 through rigid or flexible acoustic waveguide(s). Transducers 111, 112 can be a single acoustic transducer, with transmit and receive functionality separated in time (e.g., taking advantage of acoustic propagation delays, a transducer can transmit for 1 µs, then wait 1 µs, then receive for 2 µs) or separated in frequency (e.g., a transmit signal can span 1-1.5 MHz, while a receive signal can be filtered for second harmonic acoustic signals over a 2-3 MHz band).

In some examples, the structure 150 is not part of the system. In other examples, structure 150 can be integrated with the other illustrated components to form a whole. To illustrate, a plurality of sensors 111, 112, signal generation electronics 140, signal processing electronics 160, and controller 130 can be integrated with an aircraft engine (an exemplary structure 150) to obtain an aircraft engine with built in condition monitoring, and similar dedicated configurations can be implemented for other structures. Controller 130 can be equipped with wired, wireless, or other networking capability to couple with a network of a facility (e.g., a building or transportation vehicle) within which structure 150 resides. In other examples, controller 130 can be a node in an Internet of Things (IoT) environment.

First Example Method

Figure 2:
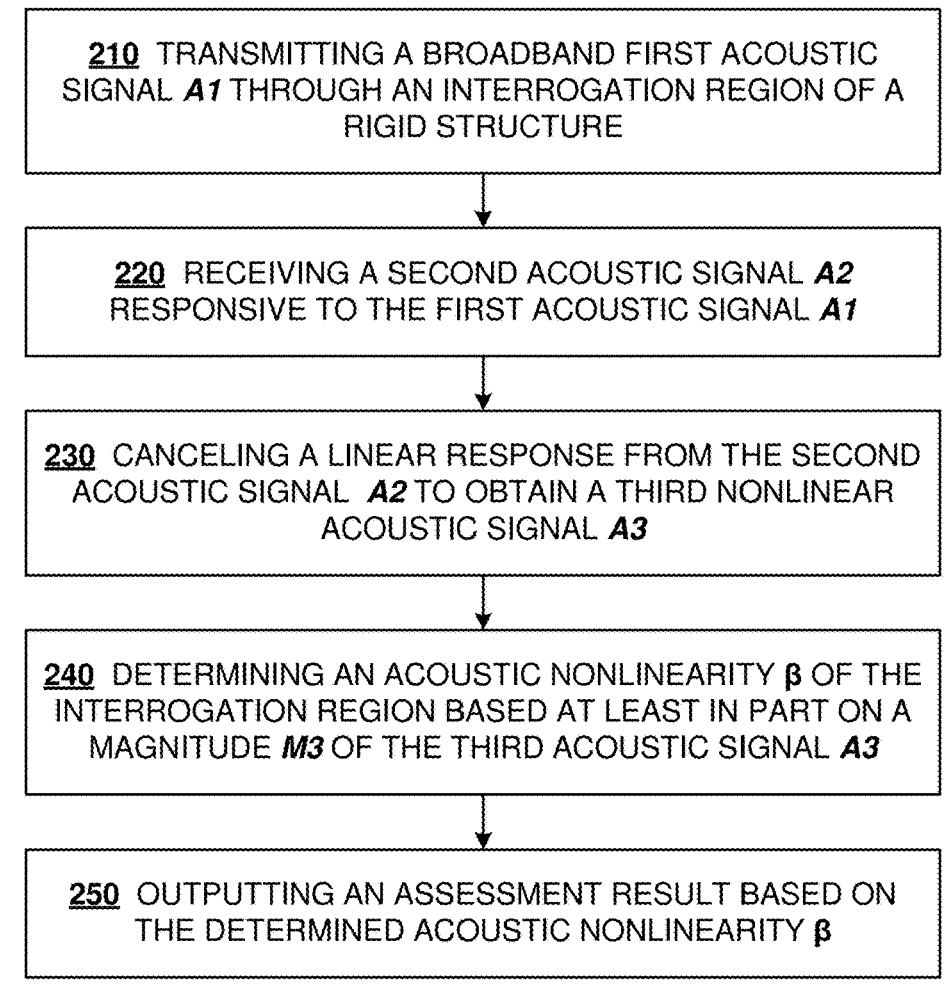
FIG. 2 is a flowchart of a first example method for assessing crack damage according to the disclosed technologies.

FIG. 2 is a flowchart 200 of a first example method for assessing microcrack damage. In this method, a broadband first acoustic signal is used as a stimulus to excite a nonlinear acoustic response, e.g., from microcracks or other defects, in an interrogation region. A received second acoustic signal is processed to determine a magnitude of nonlinear component (s), an acoustic nonlinearity of the interrogation region, leading to an assessment of crack damage being output.

At process block 210, a first acoustic transducer coupled to a first location on a rigid structure can transmit a broadband first acoustic signal A1 in an interrogation region of the rigid structure. For example, a broadband signal in the form of a chirp signal or an impulse signal can be generated and launched into the structure (which can be understood to include, for surface wave excitation, surface(s) of the structure). At block 220, a second acoustic transducer coupled to the structure at a second location, spaced apart from the first location, can receive a second acoustic signal A2 responsive to the first acoustic signal. The interrogation region can be dependent on the first and second locations. The second acoustic signal can variously include a portion of the first acoustic signal, a secondary linear signal, or a secondary nonlinear signal. A linear response from the second acoustic signal can be canceled at block 230 to obtain a nonlinear third acoustic signal A3. Cancellation techniques are described further herein, e.g., in context of FIGS. 5-6. Based at least in part on a magnitude M3 of the third acoustic signal, an acoustic nonlinearity β of the interrogation region can be determined at block 240 and, based on the determined acoustic nonlinearity, an assessment result can be outputted at block 250. The outputted result can be an alert in a case where the acoustic nonlinearity, or a change in the acoustic nonlinearity, exceeds a threshold.

Numerous variations and extensions of the depicted system can be implemented within scope of the disclosed technologies, some of which are disclosed further herein.

Example Interrogation Regions

Figure 3:
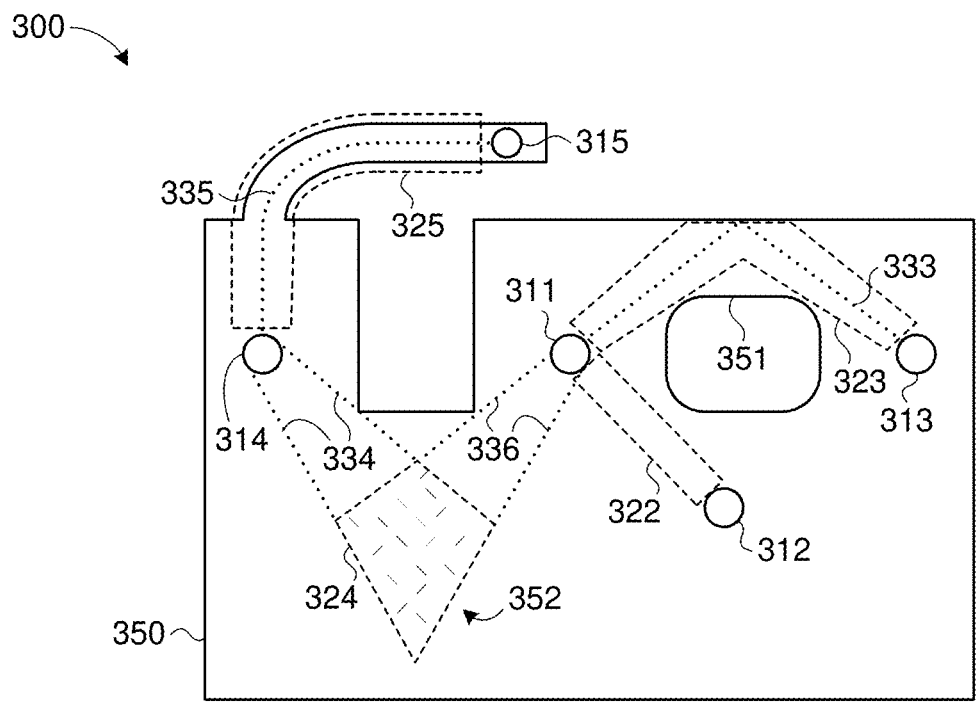
FIG. 3 is a diagram illustrating examples of interrogation regions in a structure.

FIG. 3 is a diagram 300 illustrating examples of interrogation regions in a structure. In FIG. 3, a generally planar structure 350 is depicted for convenience of illustration. As will be understood by a person of ordinary skill, the illustrated concepts are applicable to structures having complex or simple three dimensional shapes, and are applicable to bulk acoustic waves, surface acoustic waves, and combinations thereof. Applicable structures can also include structures with piecewise rigidity, e.g., linkages or other mechanisms with one or more degrees of freedom between constituent parts. In FIG. 3, acoustic transducers 311-315 are depicted as open circles, representative acoustic paths 333-336 are depicted as dotted lines, and illustrative interrogation regions are depicted with dashed outline. For clarity of illustration, boundaries of some interrogation regions are shown offset from an edge of structure 350. The person of ordinary skill will readily understand that an interrogation region can extend up to an edge or surface of structure 350 but does not extend outside structure 350. Then, the description of FIG. 3 sometimes describes a particular transducer as a transmitting device and another transducer as a receiving device. In practice transmitting and receiving acoustic transducers can sometimes be identical, and a given device can act as a transmitter in one scenario and as a receiver in another scenario or, as described herein, as both transmitter and receiver.

Transducers 311, 312 have a straight ("line of sight") path through structure 350 and, accordingly, interrogation region 322 can be generally disposed between them. Turning to transducer pair 311, 313, hole 351 blocks transducers 311, 313 from each other's line of sight. However, an acoustic wave can follow a reflected path 333 from transmitter 311 to receiver 313, leading to an interrogation region 323. In another example, an acoustic wave can be guided along bends in structure 350, as illustrated by path 335. Thus, an interrogation region 325 can be obtained between transducers 314, 315. Still further, a portion of structure 350 can have a number of scattering centers 352 depicted as short diagonal lines. Scattering centers 352 can include, without limitation, microcracks, inclusions, topographical features, or other inhomogeneities. As a result acoustic waves transmitted within a cone bounded by rays 336 can generate scattered secondary acoustic waves, within a cone bounded by rays 334, that lead to receiving acoustic transducer 314. Thereby bounding rays 334, 336 can define an interrogation region 324.

In some examples, time windowing can be used to shrink an interrogation zone and obtain further localization of crack damage. With reference to scattering centers 352, the total acoustic path length from transmitting transducer 311 to receiving transducer 315 can vary among scattering centers 352. Thus, applying a time gate to the signal received at transducer 312, for a small range of acoustic path delays, can be used to select just that slice of interrogation region 352 having total acoustic path delay within the gate. Gating can be performed directly on the received time-domain signal, or subsequently in a transform domain, after performing a short time Fourier transform of the received signal. In the transform domain, the time gate can be correlated with the time at which a particular frequency component is transmitted from transmitting transducer 311.

As described above, embodiments provide for transducers 311-314 to be part of a mesh system that can quickly interrogate large areas/regions of structure 350. The ability to quickly interrogate large areas/regions and identify regions that may include defects can provide significant advantages over conventional systems and methods, which are time consuming because they can only interrogate small areas/regions. In some examples, a mesh network utilizing transducers 311-314 may locate areas/regions within a larger area/region that may include defects (e.g., microcracks). Identification of these areas/regions may be followed by use of different instruments that may be more sensitive to further interrogate the areas/regions identified by the mesh network.

Example Nonlinear Response

Figure 4:
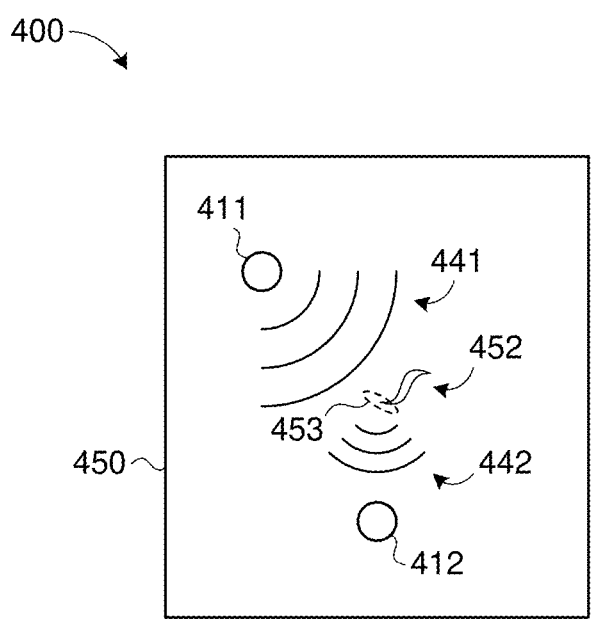
FIG. 4 is a diagram illustrating an example nonlinear response of a microcrack to an acoustic signal, according to the disclosed technologies.

FIG. 4 is a diagram 400 illustrating an example nonlinear response of a microcrack to an acoustic signal. Acoustic wave 441 is transmitted by transducer 411 toward a microcrack 452 having an edge 453 which can act as a nonlinear scattering center. When elastic waves reach a cluster of microcracks, the cracks can close and open under compression and tension stresses induced by elastic waves. At this time, compressive energy can be transmitted through the cracks while tensile energy cannot. Such stiffness changes and concentration of stress due to acoustic wave 441 at a sharp edge 453 can excite nonlinear response via a third order elastic constant of the material of structure 450. In this illustration, acoustic wave 442 emanates from edge 453 towards transducer 412 where it can be received. In addition to nonlinear acoustic response 442, transducer 412 can also receive a portion of transmitted wave 441 directly, and other linear components, such as acoustic waves reflected off an edge of structure 450, or linearly scattered by microcrack 452. A variety of techniques are described herein for removing the linear component(s) of the acoustic signal received at transducer 412. Such separation is dubbed "cancellation" of the linear component. Cancellation need not be perfect. Any procedure that reduces the power of the linear component(s) below the power of the nonlinear component(s) can be regarded as cancellation of the linear component.

First Example Cancellation Technique

Figure 5:
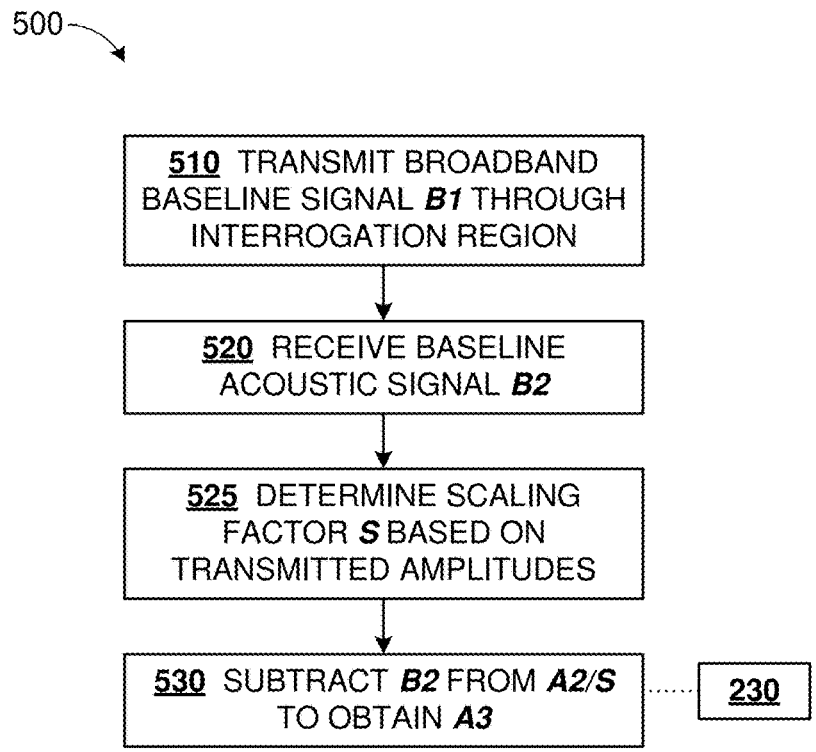
FIG. 5 is a flowchart illustrating a first example technique for canceling linear response from a received signal, according to the disclosed technologies.

FIG. 5 is a flowchart 500 illustrating a first example technique for canceling linear response from a received signal, which can be used for some embodiments of block 230 of FIG. 2. This technique makes use of the fact that nonlinear response scales at least quadratically with amplitude while the linear response scales linearly. Thus, for sufficiently weak transmitted acoustic waves, the linear response can be assumed to dominate. A weak baseline acoustic signal can be used to determine the linear response of a given setup, which can be subtracted from a scaled (normalized) response to a stronger acoustic signal.

For a simplified illustration, the first acoustic signal A1 and second acoustic signal A2 of FIG. 2 are considered to have root-mean-square (rms) amplitude of 10 μm and 30 nm respectively. The objective is to estimate how much of the 30 nm received signal amplitude is the linear response and how much is the nonlinear response.

At process block 510, a broadband baseband signal B1 can be transmitted through the interrogation region of interest, e.g., using the same setup used at block 210 of FIG. 2. In the present illustration, the rms amplitude of B1 can be 100 nm, just 1% the amplitude of A1. At block 520, a baseline acoustic signal can be received, corresponding to second acoustic signal A2 of block 220. In this illustration, the amplitude of B2 can be measured as 0.28 nm. At block 525, a scaling factor S can be determined from the transmitted amplitudes. In the present illustration, S can be evaluated to be amplitude (A1)/amplitude (B1)=(10 μm)/(100 nm)=100. Finally, at block 530, the signal A2 can be normalized as A2/S, which is 30 nm=100=0.30 nm, and the baseline amplitude of B2 (0.28 nm) can be subtracted from this. In this illustration, the subtraction can be performed coherently: for A2 and B2 in phase, subtraction would result in a nonlinear acoustic wave A3 having rms amplitude 0.30 nm−0.28 nm=0.02 nm. For other phase shifts between A2 and B2, different amplitude values for A3 can be obtained. In some examples, block 530 can be used to implement block 230 of FIG. 2. In some examples, the amplitude of A3 can be used directly as the magnitude M3 of A3 while, in other examples, a transform-based method can be used such ss described in context of FIGS. 7A-7B.

To summarize, the linear response (28 nm) can be determined proportional to (S=100) an amplitude (0.28 nm) of a baseline acoustic signal (B2) received responsive to a baseline acoustic signal (B1) transmitted through the rigid structure. The amplitude of the baseline acoustic signal (100 nm) can be less than the amplitude of the transmitted signal A1 (10 μm), and the setup (transducers and transducer locations) used to transmit and receive signals B1, B2 can be the same as for signals A1, A2.

Second Example Cancellation Technique

Figure 6:
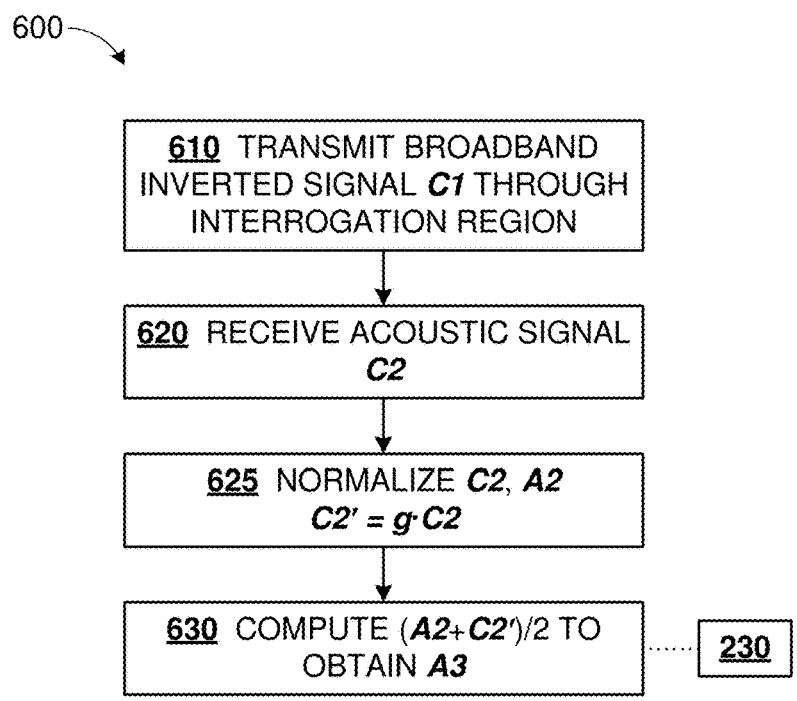
FIG. 6 is a flowchart illustrating a second example technique for canceling linear response from a received signal, according to the disclosed technologies.

FIG. 6 is a flowchart 600 illustrating a second example technique for canceling linear response from a received signal, which can be used for other embodiments of block 230 of FIG. 2. This technique makes use of the fact that linear and quadratic responses have different parity, so that parity can be used to distinguish these components in a received acoustic signal. FIG. 6 is described in context of signals A1, A2, A3 of FIG. 2.

At process block 610 a broadband inverted signal C1 is transmitted through the interrogation region. Particularly, C1 can have a same amplitude and opposite polarity as compared to A1 (that is, C1=−A1). C1 can be applied to the same setup of structure and transducers as for blocks 210, 220, but at an earlier or later time. At block 620, similar to block 220, an acoustic signal C2 can be received. Because of hardware artifacts, in practice A1 and C1 may not have identical amplitudes. To improve estimation of the nonlinear response, signals C2 and A2 can be normalized at block 625. For example, C2 can be scaled by a factor g (e.g. C2'=g·C2) so that a maximum amplitude feature in C2' has the same value as in signal A2. Other features of A2, C2 can also be used. Finally, at block 630, the signals A2 and C2' can be summed together, resulting in cancellation of their linear components (which have opposite polarity) and reinforcement of their quadratic components (which have same polarity irrespective of the polarity of the transmitted signals A1, C1). That is nonlinear acoustic response signal can be calculated as A3=k· (A2+C2'), where k is a predetermined constant. In common examples, k=0.5 or 1.0 can be used, but this is not a requirement, and any non-zero value of k can be used for cancellation. In some examples, block 630 can be used to implement block 230 of FIG. 2.

In further examples, spectral techniques can be used for cancellation of the linear component of a received acoustic signal. For example, frequencies of the transmitted acoustic signal A1 can be filtered out using either time domain analog or digital filters, or nulling corresponding coefficients of a transformed signal in the frequency domain. As another example, for a chirp signal A1, the filtering can be correlated with time, either in the time domain or in a joint frequency-time domain, e.g., resulting from a short-time Fourier transform (STFT).

Example Determination of Magnitude of Nonlinear Acoustic Signal

Figure 7A:
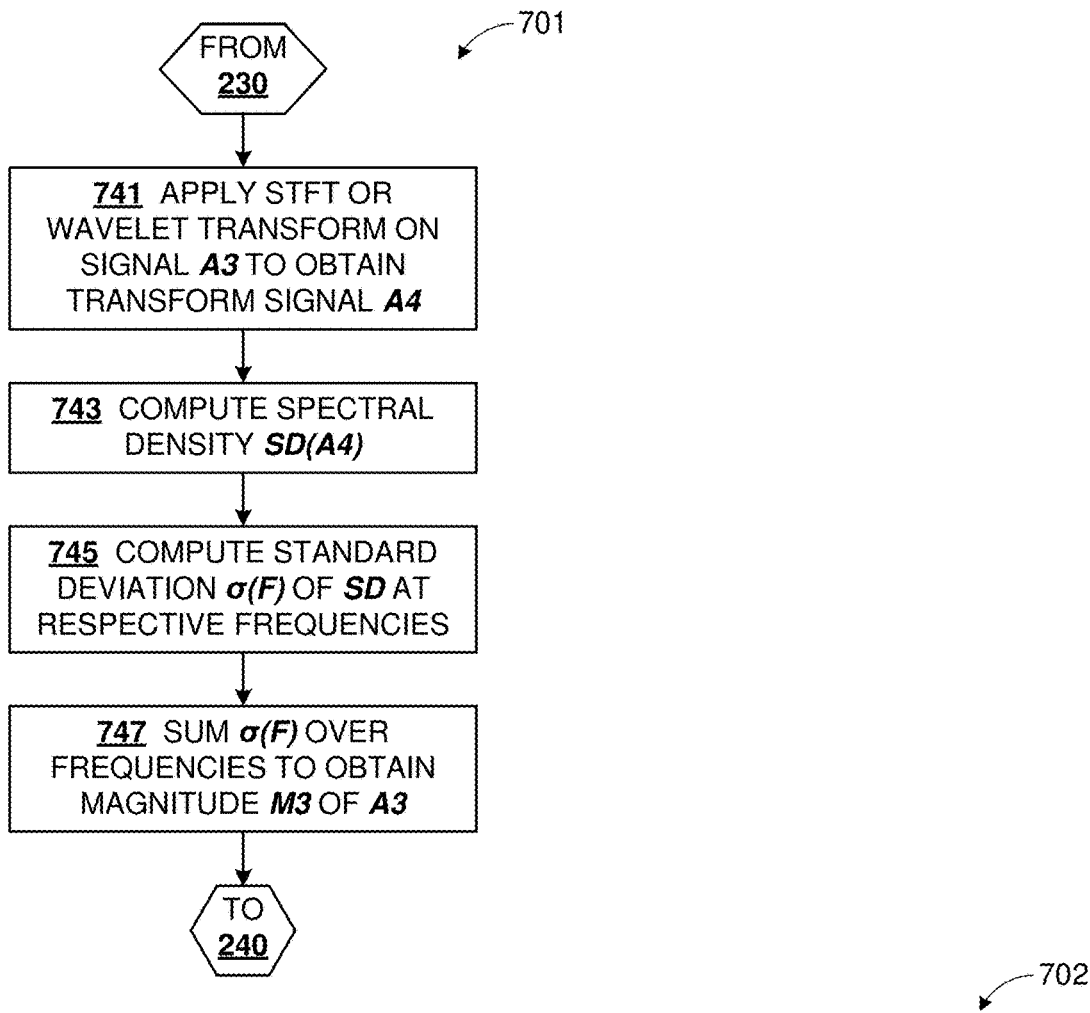
FIG. 7A is a flowchart illustrating an example technique for determining a magnitude of a nonlinear acoustic signal, according to the disclosed technologies.
Figure 7B:
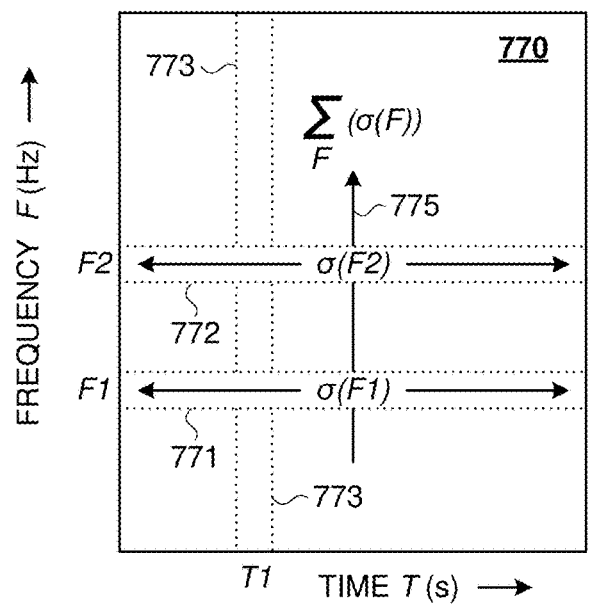
FIG. 7B depicts a transform domain to illustrate the example of FIG. 7A.

FIGS. 7A-7B pertain to a technique for determining a magnitude of a nonlinear acoustic signal using time-resolved spectral analysis, e.g., by short-time Fourier transform, a wavelet transform, or Hilbert transform. FIG. 7A is a flowchart 701, while FIG. 7B is a corresponding illustration of a transform domain.

In examples, process block 741 of FIG. 7A can be performed after block 230. At block 741, an STFT or a wavelet transform can be applied to signal A3 to obtain a two-dimensional transform signal A4 over a joint frequency and time domain 770 as illustrated in FIG. 7B. After such transform, values of A4 in a given vertical stripe 773 of transform domain 770 represent the spectral distribution of acoustic signal A3 at a corresponding time T1. Values of A4 in a given horizontal stripe 771 represent the time evolution of a component of acoustic signal A3 at a corresponding frequency F1. At block 743, the spectral density (SD) of acoustic signal A3 can be computed from A4. In examples, $SD(Fi, Ti) = |A4(Fi, Ti)|^P$. Exponent p reflects that the analysis can be performed using amplitude spectral density (ASD) with p=1, or using power spectral density (PSD) with p=2. Other exponents can also be used. The transform signal A4 and the SD can be represented over the same two-dimensional transform domain 770.

At block 745, the standard deviation $\sigma(F)$ of the SD can be computed for each frequency F. FIG. 7B illustrates $\sigma(F1)$, $\sigma(F2)$ computed over horizontal stripes 771, 772. Then, at block 747, $\sigma(F)$ can be summed over frequencies F, as indicated by arrow 775 to obtain a magnitude of the nonlinear response A3. Particularly, the magnitude M3 of A3 can be calculated as $M3 = k \cdot \Sigma_F \sigma(F)$ for some positive constant k. Magnitude M3 can be used at block 240.

Numerous variations and extensions of this technique can be implemented within scope of the disclosed technologies. In some examples, cancellation of linear components of received acoustic signal A2 can be performed by setting suitable coefficients of either A4 or SD to zero in the transform domain. In such examples, block 710 can be performed after block 220, and block 230 can be performed after block 710 and before block 730.

Example Determination of Acoustic Nonlinearity

Figure 8:
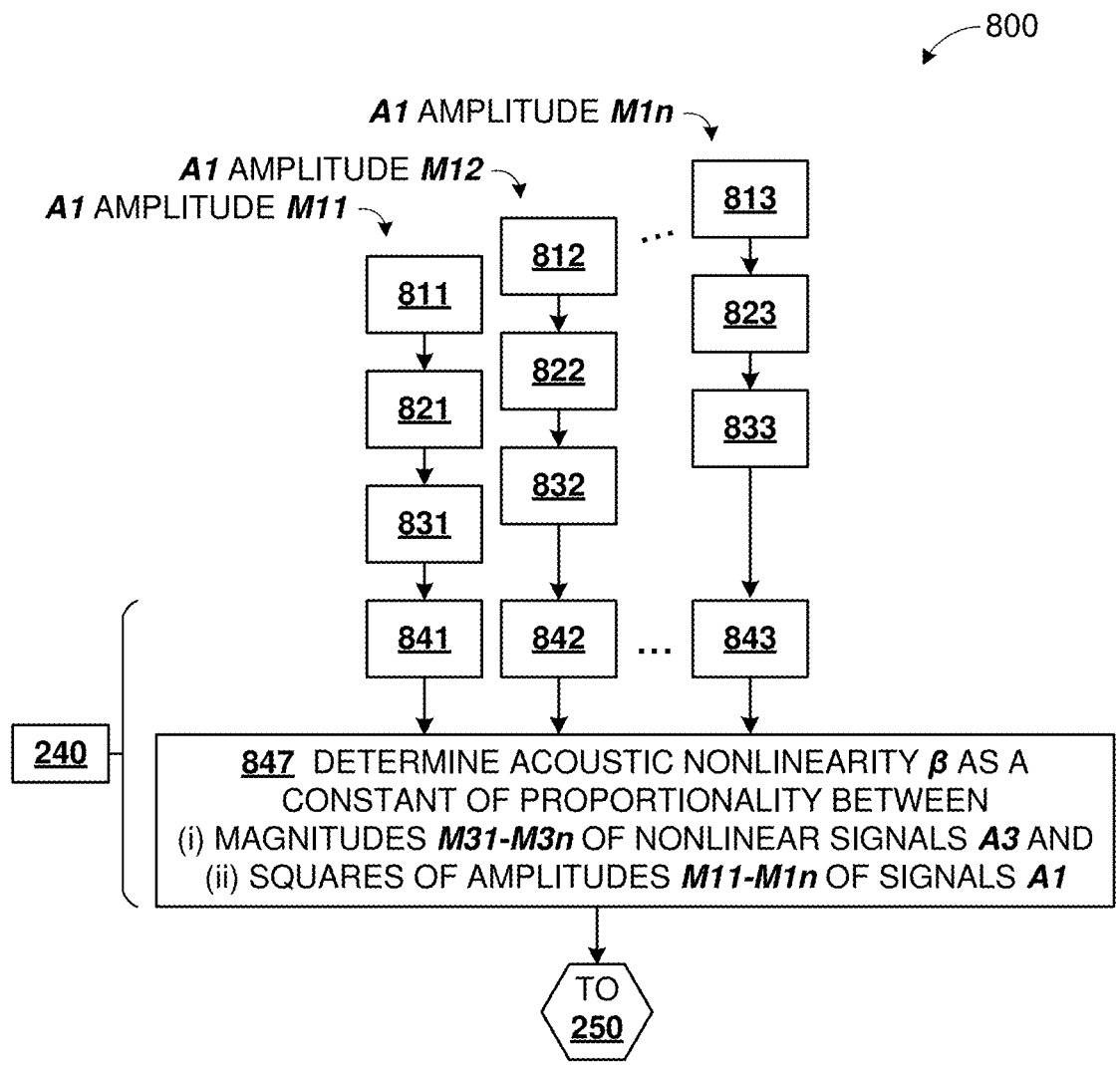
FIG. 8 is a flowchart of an example method for determining acoustic nonlinearity of an interrogation region according to the disclosed technologies.

FIG. 8 is a flowchart 800 of an example method for determining acoustic nonlinearity β of an interrogation region. In this method, the magnitude M3 of nonlinear response A3 is determined at a plurality of different amplitudes M1 of transmitted signal A1, and the acoustic nonlinearity of the assessed interrogation region of a test structure is determined from a relationship between M3 and M1.

Process blocks 811, 821, 831 correspond to blocks 210, 220, 230 of FIG. 2 for a first amplitude M11 of transmitted signal A1 and are not described further. Thus, an output of block 831 can be the nonlinear signal A3 for the case where transmitted signal A1 has amplitude M11. With this input, the corresponding magnitude M31 of A3 can be computed at block 841. Similarly, blocks 812-813, 822-823, 832-833 also correspond to the operations 210, 220, 230 for second through n-th A1 amplitudes M12-M1n. The corresponding amplitudes M32-M3n of nonlinear signal A3 can be determined by blocks 842-843. At block 847, with amplitudes M31-M3n as inputs from blocks 841-843, a constant of proportionality (e.g., slope) between M31-M3n and squares of the transmitted amplitudes M11-M1n can be determined. This constant of proportionality represents an acoustic nonlinearity coefficient β (or "acoustic nonlinearity" for short) of an instant interrogation region of an instant structure, for a given testing setup. In this example, block 240 of FIG. 2 can be performed by process blocks 841-843 and 847 collectively, and the method can proceed to block 250 as shown.

Normalization

The square-law dependence in the example of FIG. 8 is exemplary. To illustrate, in terms of transmitted amplitude M1 of excitation A1, the linear acoustic response can vary as M11 and the nonlinear acoustic response can vary as M12. Thus, nonlinear responses A3, A4 can also vary as M12. Then, following FIG. 7 and using amplitude spectral density (ASD) with p=1 at block 743, M3 can also vary as M12, suitable for block 847 as described above.

In another illustration, a normalization by M1 can be performed (e.g. A3→(A3/M1)), leading to A3 and A4 varying as M11 instead of M12, similar to that described in context of block 530. Then, if power spectral density (PSD) with p=2 is used, once again M3 varies as M12, consistent with the description of block 847. Similar normalization can be performed at the stage of computing A4 or M3 rather than while computing A3, with similar outcome.

However, other analysis flows can also be used. For example, without normalizing to M1, and using PSD at block 743, M3 can vary as M14. In such a case, analysis at a variation of block 847 can determine β as a constant of proportionality between M31-M3n and the fourth power of the transmitted amplitudes M11-M1n. In further examples, nonlinear acoustic responses can vary as M13 or another power, instead of M12, leading to other power law dependencies at block 847.

Example Method for Identifying Damage Location(s)

Figure 9:
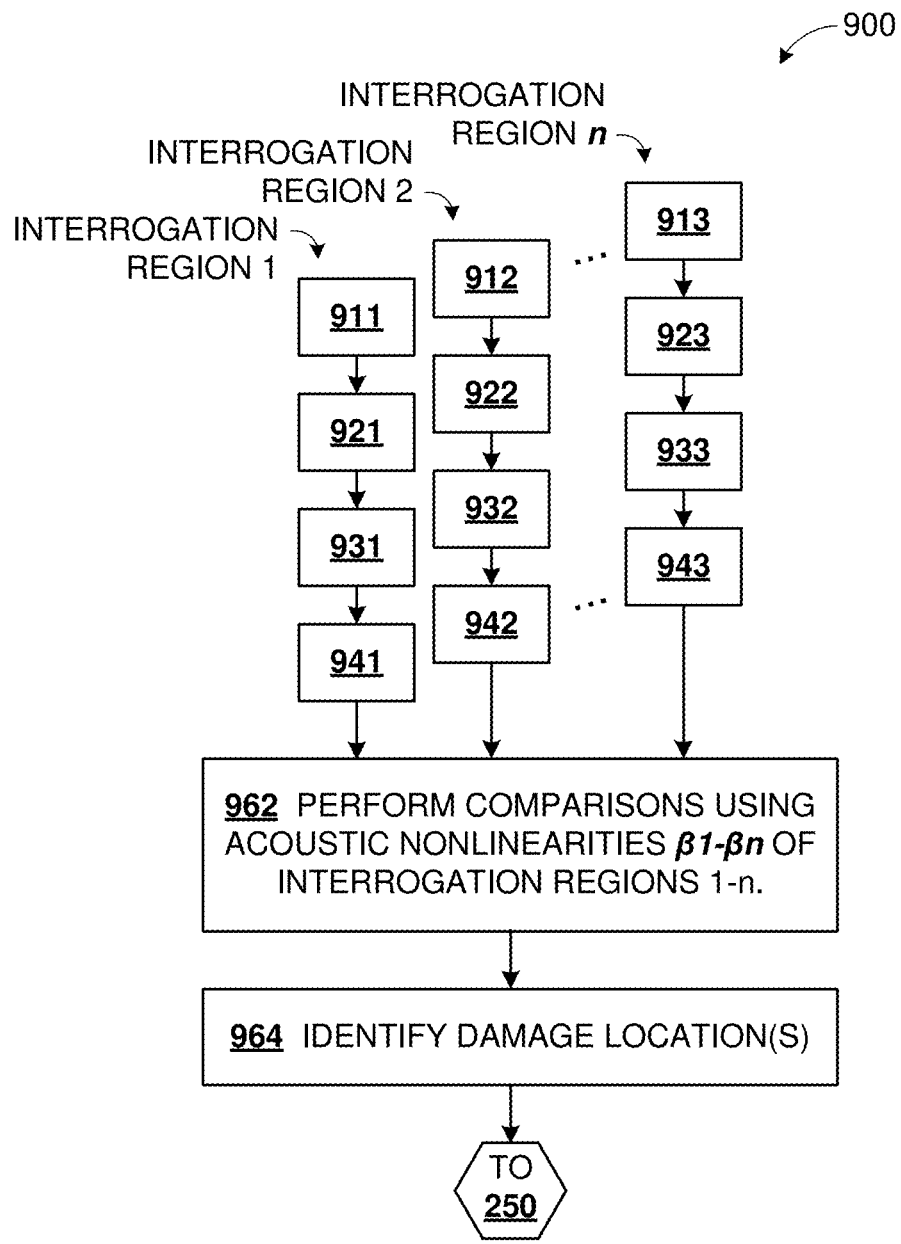
FIG. 9 is a flowchart of an example method for localizing crack damage among a plurality of interrogation regions.

FIG. 9 is a flowchart 900 of an example method for identifying damage location(s) (dubbed "localizing" crack damage) among a plurality of interrogation regions. In this method, operations similar to FIG. 2 are performed for a plurality of interrogation regions in or on a structure under test. Comparison(s) using acoustic nonlinearities can be used to identify damage locations.

Process blocks 911-913 correspond to block 210 of FIG. 2, performed for different interrogation regions 1-n as shown, and are not described further herein. Similarly, blocks 921-923, 931-933, 941-943 correspond to blocks 220, 230, 240 respectively, resulting in determination of acoustic nonlinearities β1-βn for interrogation regions 1-n.

At process block 962, comparisons can be made using β1-βn for the regions 1-n, and thereby one or more damage locations can be determined at block 964. Comparisons can variously be made between regions, relative to a predetermined threshold, or relative to a prior assessment for a given region. In some examples, a damage location can be determined as an interrogation region having acoustic nonlinearity β exceeding a predetermined threshold. In other examples, a damage location can be determined as an interrogation region where a change in acoustic nonlinearity exceeds another predetermined threshold. In further examples, one or more interrogation regions having highest rank of acoustic nonlinearity β or highest rank of change in acoustic nonlinearity β can be determined as damage location(s). Still further, these or other criteria can be combined to determine the damage location(s). To illustrate, damage locations can be identified as the union of (i) up to three interrogation regions having highest acoustic nonlinearity β of at least 0.2 and (ii) up to three interrogation regions having highest change in acoustic nonlinearity β of at least 50% since a previous assessment.

Following block 964, the method can proceed to block 250 to output a result of assessment including identification of one or more damage locations.

In some examples, two interrogation regions can utilize distinct transmitter and receiver transducers, i.e., four transducers total for the two regions. In other examples, two interrogation regions can share one transducer, i.e., three transducers total for the two regions. In further examples, two interrogation regions can utilize a same pair of transducers, and the interrogation regions can be distinguished, e.g., by time windowing as described herein.

Example Alerts

Figure 10:
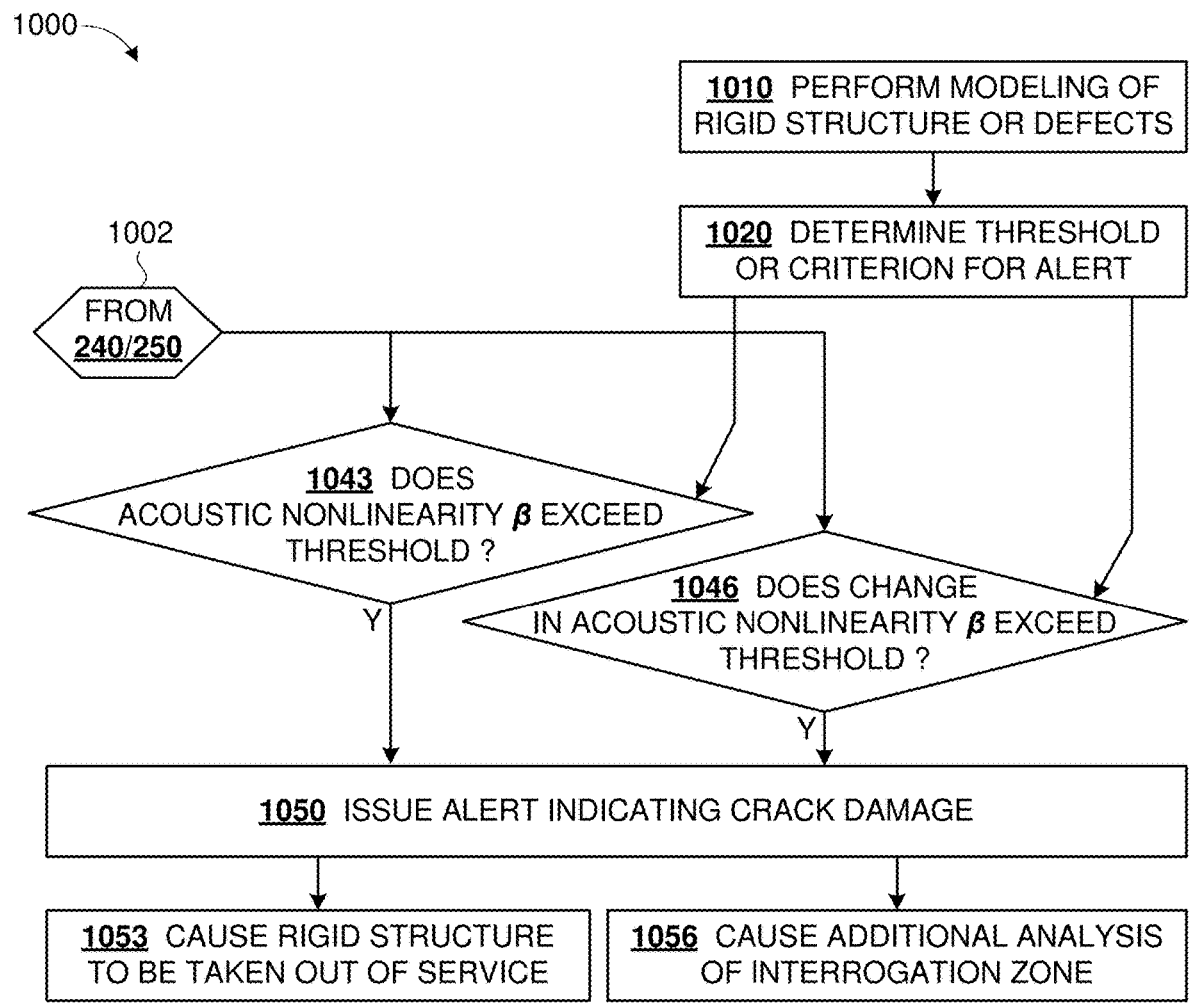
FIG. 10 is a flowchart depicting methods and variations for issuing an alert for crack damage or taking follow-up action on such alert, according to the disclosed technologies.

FIG. 10 is a flowchart 1000 depicting methods and variations for issuing an alert for crack damage or taking follow-up action on such alert. Connector 1002 depicts an entry point to flowchart 1000, which can follow block 240 or block 250 of FIG. 2 as shown.

In some examples, the method can proceed to decision block 1043, where a determination can be made whether acoustic nonlinearity β exceeds a predetermined threshold. If the predetermined threshold is exceeded, the method can follow the Y branch from block 1043 to process block 1050 where an alert message can be issued. The alert message can be in the form of a visual, audible, or haptic annunciation, or can be in the form of a message transmitted over a communication link or network.

In other examples, the method can proceed from entry point 1002 to decision block 1046, where a determination can be made whether acoustic nonlinearity β exceeds a previous assessment of β according to a predetermined criterion. As an illustration, block 1046 can determine whether an increase in acoustic nonlinearity β, over a previous value, exceeds a threshold. If the criterion is met or the predetermined threshold is exceeded, the method can follow the Y branch from block 1046 to process block 1050 where an alert message can be issued.

Process blocks 1010, 1020 depict an example technique for determining a threshold or criterion for use by decision blocks 1043, 1046. At block 1010, modeling of a test structure can be performed. In varying examples, finite element analysis (FEA), finite difference analysis (FDA), or modal analysis can be used to model the structure and/or defects within the structure. Based on such modeling, a threshold or other criterion can be determined for use in blocks 1043, 1046.

Following issuance of an alert for crack damage at process block 1050, some examples of the illustrated method can proceed to blocks 1053 or 1056. At block 1053, the issued alert can cause the assessed structure to be taken out of service. At block 1056, the issued alert can cause additional analysis to be performed on the interrogation region. To illustrate, the interrogation region can be analyzed by X-ray computed tomography.

The methods of FIG. 10 can be linked to FIG. 2 in different ways. In some examples, flowchart 1000 can be entered from block 240, and block 1050 can be an implementation of block 250. In other examples, flowchart 1000 can be entered from block 250, and illustrated blocks of FIG. 10 can be performed responsive to a value of acoustic nonlinearity β outputted by block 250.

Example Scenario

Figure 12:
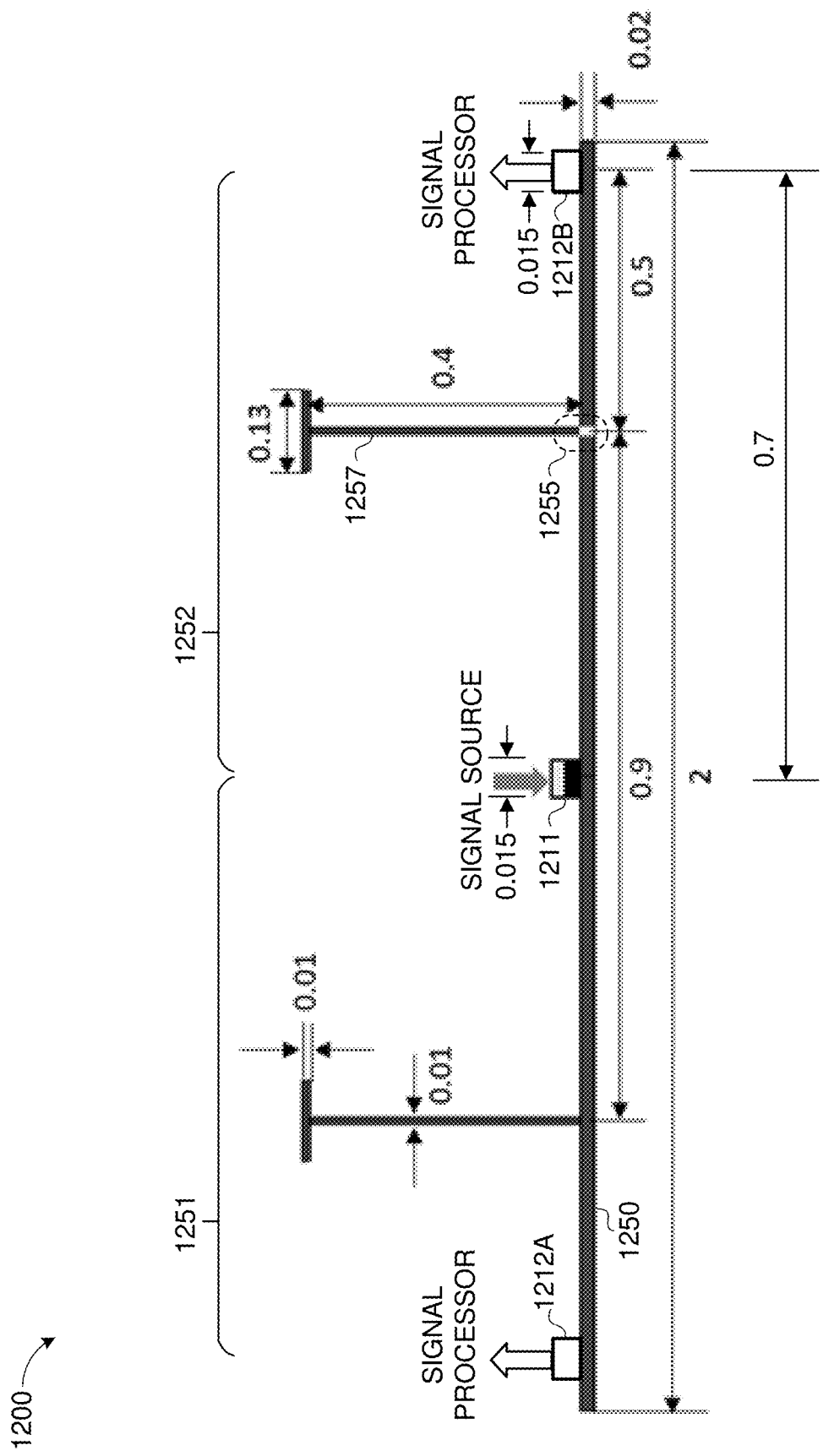
FIG. 12 is a diagram of an example scenario in which disclosed technologies can be deployed.

FIG. 12 is a diagram 1200 of an example scenario in which disclosed technologies can be deployed. A cross-section of a structural beam 1250 is shown with dimensions in meters (m). The illustrated cross-section is 2 m wide and has two reinforcement ribs 0.4 m high positioned as indicated. Beams such as this can be manufactured in lengths 2 m to 30 m or more (length being in a direction perpendicular to the plane of FIG. 12) and can be extended to even greater lengths by welding or otherwise joining successive sections.

To assess microstructural damage, three acoustic transducers are shown mounted to beam 1250. Transmitting transducer 1211 can be coupled to a signal source to drive acoustic energy into beam 1250. Receiving transducers 1212A, 1212B can detect acoustic energy derived from the transmissions of transducer 1211 and can convey corresponding electrical signals to a signal processor for analysis using any one or more of the techniques described herein. The transducer geometry effectively divides the cross-section of beam 1250 into two interrogation zones: zone 1251 extending from transmitter 1211 to receiver 1212A, and zone 1252 from transmitter 1252 to receiver 1212B. Through wave propagation effects such as reflection and diffraction (as described herein e.g. in context of FIG. 3) and due in part to the diverse propagation characteristics of broadband acoustic signals as also described herein, the interrogation zones are not limited to line-of-sight between transmitter 1211 and receiver 1212A or 1212B. Rather, the disclosed apparatus can detect microstructural damage within the ribs of beam 1250 as well.

In a demonstration with the system illustrated in FIG. 12, the disclosed technologies successfully determined both location and magnitude of microstructural defects on beam 1250. In this demonstration, microstructural damage was found to be concentrated at the junction 1255 between base and rib 1257 of beam 1250. No prior baseline measurement was used. In the illustrated example, the transverse extent of transducers 1211, 1212A, 1212B is about 1.5 cm, while the direct path between transducers 1211, 1212B is about 70 cm. The ratio 70/1.5 equals about 46.7. The interrogation region between transducers 1211, 1212B extends over this path horizontally in FIG. 12, about another 40+6.5 cm along the vertical rib structure 1257, and a comparable distance longitudinally along beam 1250 in a direction perpendicular to the plane of FIG. 12.

Numerous variations and extensions of this scenario can be implemented within scope of the disclosed technologies. In some examples arrays of transducers can be placed at lengthwise intervals along the length of beam 1250, while in other examples a given array of transducers can be shifted, in steps or continuously, along the length of beam 1250. Measurements can be made prior to assembly as part of material qualification, or after assembly as part of a preventive maintenance schedule. Other structural components such as pipes, channels, trusses, or waveguides can be similarly tested. Non-limiting applications for such structural components include ships, aircraft, submarines, pipelines, bridges, stadiums, industrial plants, process containment vessels, and other confinement chambers.

While one transmitting transducer 1211 and two receiving transducers 1212A, 1212B were used in the demonstration, this is not a requirement. Similar results can be achieved with two transmitting transducers in the locations of transducers 1212A, 1212B and one centrally positioned receiving transducer in the position of transducer 1211. In varying examples, two transmitting transducers can transmit alternately or on a predetermined schedule, or can transmit simultaneously over different frequencies.

Time windowing can be used to narrow an interrogation zone based on acoustic propagation delays for more precise location of detected microstructural defects, even in complex shapes. In the demonstration, transducer 1211 was configured to preferentially excite guided bulk acoustic waves within beam 1250, but this is not a requirement and, depending on the shape, material, and anticipated defect distribution in a given sample, surface acoustic excitation can also be used. Any one or more of the techniques described herein, such as polarity inversion, extrapolation of baseline from a low-amplitude stimulus, or spectral analysis, can be used to accurately measure nonlinear acoustic excitations without confounding from strong direct linear signals.

A Generalized Computer Environment

Figure 11:
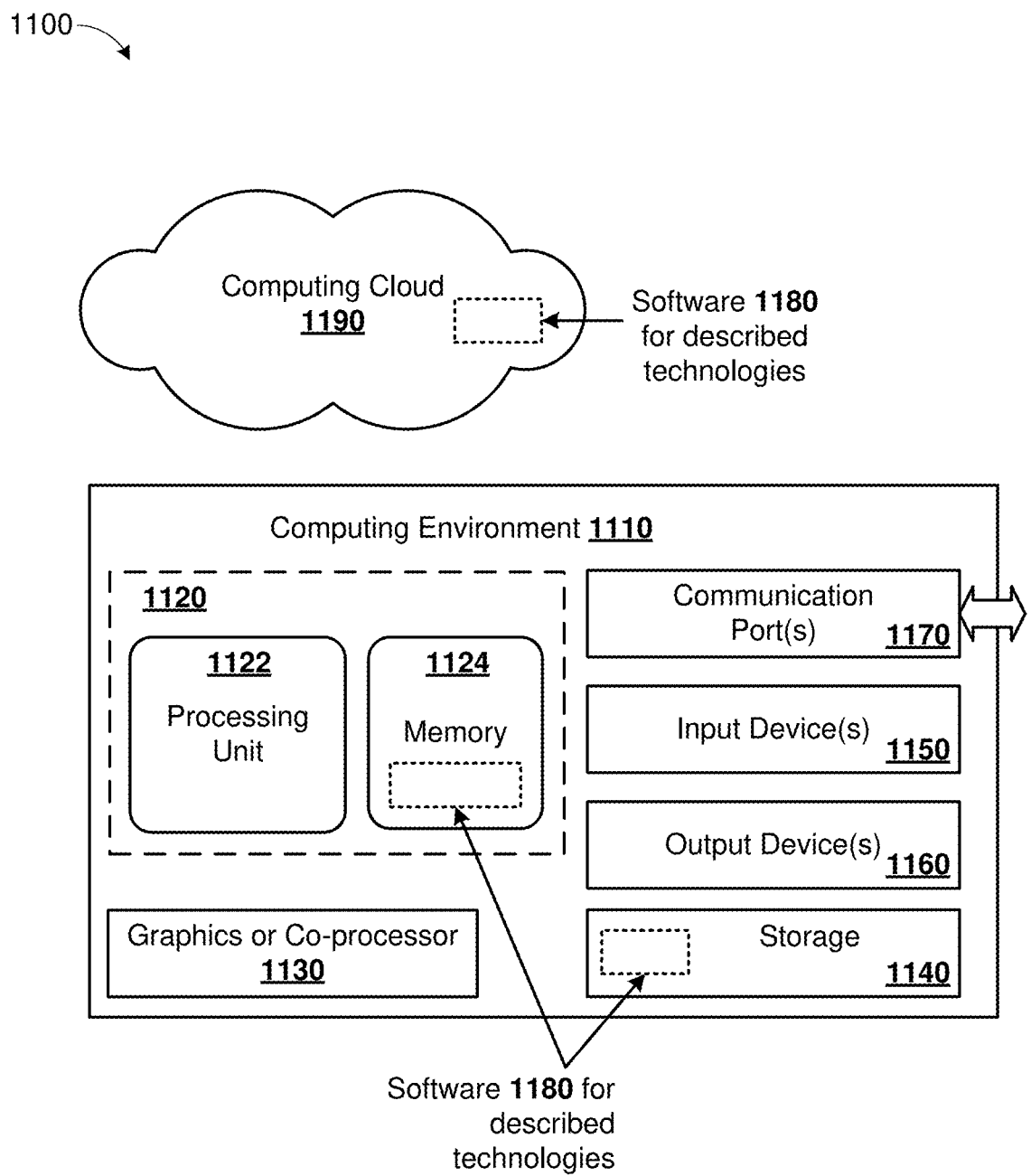
FIG. 11 illustrates a generalized example of a suitable computing environment in which described embodiments, techniques, and technologies, including detection or monitoring of microstructural damage in a structure, can be implemented.

FIG. 11 illustrates a generalized example of a suitable computing environment 1100 in which described examples, techniques, and technologies, including generating or processing acoustic signals to assess microstructural damage, can be implemented. For example, the computing environment 1100 can implement any function or combination described herein with respect to the figures or claims.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand-held devices, multiprocessor systems, microprocessor-based or programmable consumer electronics, network PCs, minicomputers, mainframe computers, compute clusters, supercomputers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180, images, and video that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium, including cloud storage, which can be used to store information and that can be accessed within, or from within, the computing environment 1100. The storage 1140 stores instructions for the software 1180 and associated data, which can implement technologies described herein.

The input device(s) 1150 may be a touch input device, such as a keyboard, keypad, mouse, touch screen display, pen, or trackball, a voice input device, a scanning device, or another device, that provides input to the computing environment 1100. The input device(s) 1150 can also include interface hardware for connecting the computing environment to control and receive data from measurement acquisition components, including data acquisition systems coupled to a plurality of sensors, or a sensor network.

For audio, the input device(s) 1150 may be a sound card or similar device that accepts acoustic signal input in analog or digital form, or an optical disc reader that provides audio samples to the computing environment 1100. The output device(s) 1160 may be a display, printer, speaker, CD-writer, or another device that provides output from the computing environment 1100. A measurement acquisition subsystem 1125 or a peripheral controller 1115 can also be included within computing environment 1100.

The communication connection(s) 1170 enable communication over a communication medium (e.g., a connecting network) to another computing entity. The communication medium conveys information such as computer-executable instructions, compressed graphics information, video, or other data in a modulated data signal.

Some examples of the disclosed methods can be performed using computer-executable instructions implementing all or a portion of the disclosed technology in a computing cloud 1190. For example, modeling a structure or analyzing a received acoustic signal can be performed on remote servers located in the computing cloud 1190 (e.g., as part of the computing environment 1100 of FIG. 11).

Computer-readable media are any available media that can be accessed within a computing environment 1100. By way of example and not limitation, with the computing environment 1100, computer-readable media include memory 1120 and/or storage 1140. As should be readily understood, the terms computer-readable storage media or computer-readable media include the media for data storage such as memory 1120 and storage 1140, and do not include transmission media such as modulated data signals or carrier waves. In addition, the terms computer-readable media and computer-readable storage media do not include communication ports (e.g., 1170) or communication media.

General Considerations

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "generate." "analyze." "calculate," "cancel," "compare," "compute," "control," "determine." "estimate." "excite," "filter." "identify." "model." "obtain," "output." "receive," "subtract," "sum," "transform," "transmit," "use," and "window," to describe the disclosed methods. These terms are high-level abstractions of the actual operations that are performed, e.g., by a computing device or under control of a computing device. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available, proprietary, hosted, or dedicated computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, a software library, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C. C++, Java, Python, R. SQL, SAS, MATLAB®, Common Lisp, Scheme, *Julia*, Dylan, Fortran, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Having described and illustrated the principles of our innovations in the detailed description and accompanying drawings, it will be recognized that the various examples can be modified in arrangement and detail without departing from such principles.

In view of the many possible examples to which the principles of the disclosed subject matter may be applied, it should be recognized that the illustrated examples are only preferred examples of the disclosed subject matter and should not be taken as limiting the scope of the claimed subject matter. We claim as our invention all such embodiments as may come within the scope of the following claims and equivalents thereto.

We claim:

1. A method for identifying microstructural defects in a rigid structure, comprising:
   (a) transmitting, with a first acoustic transducer coupled to a first location on the structure, a broadband multimode first acoustic signal through an interrogation region of the rigid structure, wherein the broadband multimode first acoustic signal comprises a chirp excitation or an impulse excitation;
   (b) receiving, with a second acoustic transducer coupled to the structure at a second location spaced apart from the first location, a second acoustic signal responsive to the first acoustic signal;
   wherein the interrogation region of the rigid structure is dependent on the first and second locations and has an extent at least ten times a largest transverse extent of a sensor contact area of the first acoustic transducer;
   (c) canceling a linear response from the second acoustic signal to obtain a nonlinear third acoustic signal;
   (d) determining an acoustic nonlinearity of the interrogation region based at least in part on a magnitude of the third acoustic signal; and
   (e) outputting an assessment result based on the determined acoustic nonlinearity.

2. The method of claim 1, wherein the interrogation region encompasses an acoustic propagation path from the first acoustic transducer to the second acoustic transducer, the acoustic propagation path having one or more reflections.

3. The method of claim 1, wherein the interrogation region encompasses a guided acoustic propagation path from the first acoustic transducer to the second acoustic transducer, the guided acoustic propagation path having one or more bends.

4. The method of claim 1 wherein, responsive to the determined acoustic nonlinearity exceeding a predetermined threshold, the outputted result is a defect alert.

5. The method of claim 1 wherein, responsive to the determined acoustic nonlinearity exceeding a previous assessment result according to a predetermined criterion, the outputted result is a defect alert.

6. The method of claim 1, wherein the outputted result is a defect alert and is further based on modeling of at least a portion of the rigid structure including the interrogation region.

7. The method of claim 1, wherein the extent of the interrogation region is at least 50 times the largest transverse extent of the sensor contact area of the first acoustic transducer.

8. The method of claim 1, wherein the first acoustic signal has a first amplitude and the canceling the linear response comprises:
   determining a proportional response by scaling an amplitude of a second baseline acoustic signal received with the second acoustic transducer responsive to a first baseline acoustic signal transmitted through the rigid structure with the first acoustic transducer, wherein the first amplitude exceeds an amplitude of the first baseline acoustic signal; and
   subtracting the proportional response from the second acoustic signal.

9. The method of claim 1, further comprising:
   (f) transmitting through the rigid structure, with the first acoustic transducer, a fourth acoustic signal having a same amplitude and opposite polarity relative to the first acoustic signal; and
   (g) receiving, with the second acoustic transducer, a fifth acoustic signal responsive to the third acoustic signal;
   wherein the canceling the linear response comprises summing the second acoustic signal and the fifth acoustic signal.

10. The method of claim 1, further comprising determining the magnitude of the third acoustic signal by:
    performing a short-term Fourier transform or a wavelet transform on the third acoustic signal to obtain a transform signal; and
    computing a spectral density of the transform signal.

11. The method of claim 10, further comprising:
    computing values of standard deviation of the spectral density at respective frequencies; and
    determining the magnitude as proportional to a sum of the values of standard deviation over the frequencies.

12. The method of claim 1, wherein the interrogation zone is a first interrogation zone, the acoustic nonlinearity is a first acoustic nonlinearity, and the method further comprises:
    receiving, responsive to the first acoustic signal, one or more additional acoustic signals corresponding to respective additional interrogation regions;
    determining respective additional acoustic nonlinearities of the additional interrogation regions based on the additional acoustic signals; and
    identifying a damage location from one or more comparisons among the additional acoustic nonlinearities and/or the first acoustic nonlinearity.

13. The method of claim 1, wherein the first acoustic signal is an initial first acoustic signal having an initial amplitude, the third acoustic signal is an initial third acoustic signal, and the method further comprises:
    repeating actions (a), (b), and (c) for one or more additional first acoustic signals, having respective amplitudes, to obtain one or more additional nonlinear third acoustic signals;
    wherein the acoustic nonlinearity is determined as a constant of proportionality between (i) respective magnitudes of the initial and additional third acoustic signals and (ii) squares of respective amplitudes of the initial and additional first acoustic signals.

14. One or more computer-readable storage media storing computer-executable instructions which, when executed by one or more hardware processors, cause the method of claim 1 to be performed, in at least a case wherein the one or more hardware processors are coupled via the first and second acoustic transducers to the rigid structure.

15. A system comprising:
    a controller comprising one or more hardware processors with memory coupled thereto;
    first and second acoustic transducers;
    a signal generator having a control input coupled to the controller and a signal output coupled to the first acoustic transducer; and
    a signal processor having a signal input coupled to the second acoustic transducer and a receiver output coupled to the controller;
    wherein the system is configured to perform operations comprising:
    (a) transmitting, with the first acoustic transducer, a broadband first acoustic signal through an interrogation region of a rigid structure;
    (b) receiving, with the second acoustic transducer, a second acoustic signal responsive to the first acoustic signal;
    wherein the first and second transducers are respectively coupled to the rigid structure at first and second locations which define the interrogation region, the interrogation region having an extent at least ten times a largest transverse extent of sensor contact areas of the first acoustic transducer or the second acoustic transducer;
    (c) canceling a linear response from the second acoustic signal to obtain a nonlinear third acoustic signal;
    (d) determining an acoustic nonlinearity of the interrogation region based at least in part on a magnitude of the third acoustic signal; and
    (e) outputting an assessment result for the interrogation region of the rigid structure based on the determined acoustic nonlinearity, wherein the outputted assessment result is a defect alert and is further based on modeling of at least a portion of the rigid structure including the interrogation region.

16. The system of claim 15, wherein the broadband first acoustic signal comprises a chirp excitation or an impulse excitation.

17. The system of claim 15, wherein the first acoustic signal has a first amplitude and wherein the operations further comprise:
    determining an amplitude of a second baseline acoustic signal received with the second acoustic transducer responsive to a first baseline acoustic signal transmitted through the rigid structure with the first acoustic transducer, wherein the first amplitude exceeds an amplitude of the first baseline acoustic signal; and
    the operation of canceling the linear response comprises:
    scaling the second acoustic signal based on a ratio of the first amplitude to the amplitude of the first baseline acoustic signal; and
    subtracting the second baseline acoustic signal from the scaled second acoustic signal.

18. The system of claim 15, wherein the operations further comprise:

(f) transmitting through the rigid structure, with the first acoustic transducer, a fourth acoustic signal having a same amplitude and opposite polarity relative to the first acoustic signal; and (g) receiving, with the second acoustic transducer, a fifth acoustic signal responsive to the third acoustic signal;

wherein the canceling the linear response comprises summing the second acoustic signal and the fifth acoustic signal.

19. The system of claim 15, wherein the operations further comprise determining the magnitude of the third acoustic signal by:

performing a short-term Fourier transform or a wavelet transform on the third acoustic signal to obtain a transform signal;

computing a spectral density of the transform signal;

computing values of standard deviation of the spectral density at respective frequencies; and determining the magnitude as proportional to a sum of the values of standard deviation over the frequencies.

20. A method for detecting or monitoring a crack or fracture in an elongated rigid structure, the method comprising:

locating a first acoustic transducer at a first location along a surface of the rigid structure;

locating a second acoustic transducer at a second location along the surface of the rigid structure;

locating a third acoustic transducer at a third location along the surface of the rigid structure, wherein the second location is between the first location and the third location, a longitudinal spacing between the first location and the second location defines a first interrogation zone, and a longitudinal spacing between the second location and the third location define a second interrogation zone, and wherein at least one of the longitudinal spacings defining the first interrogation zone or the second interrogation zone is at least ten times a largest transverse extent of an active area of the second acoustic transducer;

generating, with the second acoustic transducer, a baseline broadband acoustic signal along the rigid structure;

obtaining, with the first acoustic transducer, a first linear response baseline signal responsive to the baseline broadband acoustic signal in the first interrogation zone;

obtaining, with the third acoustic transducer, a second linear response baseline signal responsive to the baseline broadband acoustic signal in the second interrogation zone;

generating, with the second acoustic transducer multiple probing broadband acoustic signals, with respective signal strengths exceeding a signal strength of the baseline broadband acoustic signal, along the rigid elongated structure;

obtaining, with the first acoustic transducer, multiple first monitoring signals responsive to respective ones of the multiple probing broadband acoustic signals in the first interrogation zone;

obtaining, with the third acoustic transducer, multiple second monitoring signals responsive to the respective probing broadband acoustic signals in the second interrogation zone;

determining a plurality of first nonlinear response signals for the first interrogation zone from the first monitoring signals by: performing baseline subtraction on each of the first monitoring signals using the first linear response baseline signal, to determine a respective one of the first nonlinear response signals;

determining a plurality of second nonlinear response signals for the second interrogation zone from the second monitoring signals by: performing baseline subtraction on each of the second monitoring signals using the second linear response baseline signal, to determine a respective one of the second nonlinear response signals;

determining whether microstructural defects exceed a first threshold in the first interrogation zone based on the first nonlinear response signals; and determining whether microstructural defects exceed a second threshold in the second interrogation zone based on the second nonlinear response signals.

\* \* \* \* \*